(12) United States Patent
Ober et al.

(10) Patent No.: US 10,501,130 B2
(45) Date of Patent: Dec. 10, 2019

(54) SYSTEM FOR IMMOBILIZING A SEMI-TRAILER KINGPIN ON A TRANSPORT VEHICLE

(71) Applicant: LOHR INDUSTRIE, Hangenbieten (FR)

(72) Inventors: Jacques Ober, Strasbourg (FR); Jean-Luc Andre, Molsheim (FR)

(73) Assignee: LOHR INDUSTRIE, Hangenbieten (FR)

( * ) Notice: Subject to any disclaimer, the term of this patent is extended or adjusted under 35 U.S.C. 154(b) by 13 days.

(21) Appl. No.: 15/777,122

(22) PCT Filed: Dec. 23, 2016

(86) PCT No.: PCT/FR2016/053661
§ 371 (c)(1),
(2) Date: May 17, 2018

(87) PCT Pub. No.: WO2017/109436
PCT Pub. Date: Jun. 29, 2017

(65) Prior Publication Data
US 2018/0334204 A1  Nov. 22, 2018

(30) Foreign Application Priority Data

Dec. 24, 2015  (FR) ..................... 15 63292

(51) Int. Cl.
*B60P 7/08* (2006.01)
*B62D 53/10* (2006.01)
(Continued)

(52) U.S. Cl.
CPC ............. *B62D 53/10* (2013.01); *B60P 3/06* (2013.01); *B60P 3/07* (2013.01); *B61D 3/16* (2013.01);
(Continued)

(58) Field of Classification Search
CPC .. B62D 53/10; B62D 53/0842; B63B 25/002; B63B 25/008; B63B 25/28; B63B 25/24;
(Continued)

(56) References Cited

U.S. PATENT DOCUMENTS

| 5,139,374 A | * | 8/1992 | Holt | ..................... B61D 45/005 410/58 |
| 5,701,257 A | | 12/1997 | Miura et al. | |
| 2005/0191147 A1 | * | 9/2005 | Engle | ....................... B60D 1/66 410/58 |

FOREIGN PATENT DOCUMENTS

| EP | 1874607 B1 | 9/2008 |
| EP | 2139742 A1 | 1/2010 |

OTHER PUBLICATIONS

International Search Report issued in PCT/FR2016/053661 dated Apr. 21, 2017.
(Continued)

*Primary Examiner* — Stephen T Gordon
(74) *Attorney, Agent, or Firm* — Marshall, Gerstein & Borun LLP

(57) ABSTRACT

A system for immobilizing a semi-trailer kingpin on a transport vehicle includes a balance arm and a substantially horizontal rigid linking structure designed to guide the vertical movement of the receiving nacelle, hold it in position above the lifting system in a horizontal plane and take up the forces exerted thereon. The longitudinal rigid linking structure is hingedly linked to the receiving nacelle and to the transport vehicle in order to take up the longitudinal forces from same, and the balance arm includes preloaded springs that take up the forces exerted on the balance arm when the receiving nacelle is temporarily inclined relative to the horizontal plane. The lifting system for lifting the
(Continued)

receiving nacelle is mounted pivoting on the railway unit at a pivot pin transverse to the longitudinal axis of the transport vehicle.

17 Claims, 8 Drawing Sheets

(51) Int. Cl.
| | | |
|---|---|---|
| *B61D 3/16* | (2006.01) | |
| *B61D 3/18* | (2006.01) | |
| *B61D 45/00* | (2006.01) | |
| *B60P 3/06* | (2006.01) | |
| *B63B 25/00* | (2006.01) | |
| *B61D 13/00* | (2006.01) | |
| *B60P 3/07* | (2006.01) | |
| *B63B 25/24* | (2006.01) | |
| *B63B 25/28* | (2006.01) | |
| *B62D 53/08* | (2006.01) | |

(52) U.S. Cl.
CPC ............... *B61D 3/166* (2013.01); *B61D 3/18* (2013.01); *B61D 3/182* (2013.01); *B61D 3/184* (2013.01); *B61D 13/00* (2013.01); *B61D 45/004* (2013.01); *B61D 45/005* (2013.01); *B62D 53/0842* (2013.01); *B63B 25/00* (2013.01); *B63B 25/002* (2013.01); *B63B 25/008* (2013.01); *B63B 25/24* (2013.01); *B63B 25/28* (2013.01)

(58) Field of Classification Search
CPC ... B63B 25/00; B60P 3/06; B60P 3/07; B61D 13/00; B61D 45/005; B61D 45/004; B61D 3/182; B61D 3/16; B61D 3/166; B61D 3/18; B61D 3/184
USPC .................... 410/56–58, 61, 62, 64; 105/355
See application file for complete search history.

(56) References Cited

OTHER PUBLICATIONS

Written Opinion issued in PCT Patent Application No. PCT/FR2016/053661 dated Apr. 21, 2017.

\* cited by examiner

SYSTEM FOR IMMOBILIZING A SEMI-TRAILER KINGPIN ON A TRANSPORT VEHICLE

TECHNICAL FIELD

The present disclosure relates to the general technical field of the transport of semi-trailers or trailers by road vehicles such as lowboys or flatbeds for transporting them over the road, railway units for transporting them on rails, aircraft for their air transport or ships for their maritime or river transport.

The disclosure concerns a system for immobilizing a kingpin of a semi-trailer on a support structure in semi-trailer transport devices. According to this system, a cowling part is mounted, by a central opening, on the kingpin of semi-trailers in order to be received in a receiving element, called nacelle, which is mounted on the support structure.

More particularly, the disclosure concerns a support structure provided for the transport of semi-trailers associated with a locking system, wherein means enabling the vertical movement of the nacelle towards and away from the cowling part comprise a device intended to guide the vertical movement of the receiving nacelle. Such a device is provided to work under tension/compression and possibly to include a shock detection device to indicate that the structural integrity of the locking system and of the kingpin is likely to be damaged in the event of shocks, particularly buffering shocks of the railway unit in the railway application.

The disclosure also relates to the transport of semi-trailers equipped with a kingpin in order to enable their immobilization on a support structure. For reasons of simplification and by definition, reference will only be made in the following to semi-trailers, but the term "semi-trailer" as used herein should therefore be broadly understood also to include trailers equipped with a kingpin.

BACKGROUND

The kingpin of standardised semi-trailers is provided to engage separately on a fifth wheel carried by a towing vehicle in order to form a pivot link allowing semi-trailers to be moved by the towing vehicle associated therewith.

Known from patent EP 1874607, in the name of the applicant, is a system of locking the kingpin of a semi-trailer on a railway unit in which a cowling part is mounted, by a central opening, on the kingpin of semi-trailers in order to be received in a receiving element, called nacelle, which is mounted on the railway unit. This nacelle is in particular intended to automatically center and lock the cowling part, along with the kingpin, when the cowling part is received within the nacelle. This nacelle is normally moved by a lifting means enabling the nacelle to be moved vertically to receive the cowling part and the kingpin in order to hold and lock them. This lifting means normally comprises a jack screw unit intended to support the vertical load of the semi-trailer.

According to this prior kingpin locking system, the nacelle is pivotally mounted on a support unit composed of a link table resting flat on the railway structure in order to provide stability to the nacelle around the roll axis. This link table is pivotally mounted, articulated at its rear end onto the railway structure so as to be free in longitudinal articulated movements and for pivoting upwards. This articulated structure for linking the nacelle to the railway structure gives the link table sufficient articulation for longitudinal and vertical movements with respect to the railway structure to enable the nacelle to be raised and lowered.

In the event of buffering shock of the railway unit carrying the semi-trailer, or during other events, the railway unit receives a violent impact. Because the nacelle is connected to the support unit, which allows free longitudinal travel movements, the impact is transmitted to the locking system and to the kingpin.

Currently, the locking system, although very strong, does not meet railway standards and is susceptible to being damaged by such a shock, which can be equivalent to a force of several tens of tons. Indeed, the means of raising the nacelle generally comprises a vertical jack screw designed to withstand loads and vertical shocks, but is vulnerable to bending forces and horizontal shocks.

In effect, according to the prior kingpin locking system, the lifting means is fixedly mounted on the railway unit and it therefore sustains a large part of the longitudinal shock in the event of buffering shock.

Similarly, at the cowling part, a shock risks damaging the kingpin because it meets road standards, which are less demanding than railway standards on this point.

Possible damage to a locking system or kingpin is not easily detectable after a shock. Thus, after a violent shock during a buffering shock, these elements can be weakened without this being detected. Thus, the operators loading and unloading trailers on the railway unit may continue doing their work without being aware of this weakness, which can have serious consequences.

Indeed, if the locking system is defective during railway transport of a semi-trailer, that semi-trailer is likely no longer to be immobilized on the railway unit and could fall from it.

In the case of a weakened kingpin, when the driver, after having unloaded the semi-trailer from the railway unit, takes it to its final destination by towing it with his tractor, the kingpin is likely to break during travel and the semi-trailer can turn over on the road, with tragic consequences.

There is therefore a need for a device intended to ensure the structural integrity of the locking system, which must allow a certain tolerance to the stresses experienced during operation under normal situations. Thanks to such a device, the locking system can advantageously meet railway standards.

Optionally, in the event of buffering shock of the railway unit or other shocks likely to damage the locking system or the kingpin, there is also a need for a shock detection device that makes it possible to detect whether the railway unit carrying the semi-trailer has undergone a shock likely to damage the kingpin.

These different devices must advantageously be able to be calibrated in order to be triggered beyond a predetermined shock threshold. Depending on the operating requirements, this threshold can be modified to allow detection of weaker shocks, particularly with a desire to protect transported merchandise, or heavier shocks, for example in the case of different railway standards.

SUMMARY OF THE DISCLOSURE

Consequently, the object of the disclosed embodiments is to respond to the aforementioned disadvantages by proposing a new system of immobilizing a semi-trailer on a support structure for the transport thereof.

Another object of the disclosed embodiments is to propose a new system of locking the kingpin of a semi-trailer, on a railway unit for example, designed to allow a certain tolerance to stresses during operation thereof under normal situations.

Another object of the disclosed embodiments is to provide a shock detection device for [a] kingpin immobilization system of a semi-trailer on a support structure, and particularly on a railway unit.

The objects assigned to the disclosed embodiments are achieved by means of an immobilization system for immobilizing a semi-trailer for the transport thereof on or in a support structure, said immobilization system comprising a kingpin locking system of the semi-trailer on said support structure, which locking system comprises:

a receiving nacelle mounted vertically movable on the support structure and intended to receive a cowling part mounted by a central opening on the kingpin of a semi-trailer, a lifting system comprising a lifting device disposed substantially vertically beneath the receiving nacelle and attached thereto in order to move it vertically between a low position and at least one high position, characterized in that:

the lifting system is mounted pivotally on the support structure at a transverse pivot pin, the lifting device is attached to the receiving nacelle by means of an articulation allowing at least one longitudinal tilting movement of the receiving nacelle, and in that the locking system further comprises the following means:

mechanical stops that limit the longitudinal forwards and backwards tilting movement of the receiving nacelle;

an elastic return device that returns the receiving nacelle to a non-tilted position;

a substantially horizontal rigid linking structure extending longitudinally and absorbing the longitudinal forces on the receiving nacelle, said rigid linking structure being hingedly connected to the receiving nacelle by the first end thereof and hingedly connected to the support structure by the second end thereof.

The longitudinal forces exerted on the receiving nacelle are thus transmitted to the rigid linking structure. The elastic return device enables the temporarily tilted nacelle to adapt to the angle of the semi-trailer by forcing it into the non-tilted position, while the amplitude of tilting movement of the receiving nacelle is limited by the stops, which prevents excessive tilting of the receiving nacelle. These different means therefore advantageously enable the kingpin locking system of the disclosed embodiments to meet the various requirements, and particularly the railway standards for sturdiness.

According to one exemplary implementation, the articulation comprises a ball and socket joint that allows free orientation of the receiving nacelle. Said ball and socket joint ensures the vertical retention of the receiving nacelle while allowing the free orientation thereof. It permits the kingpin locking system to conform to the deck of the semi-trailer in the event the deck is not perfectly horizontal.

According to another exemplary implementation, the elastic return device comprises at least one preloaded spring which maintains the receiving nacelle in the non-tilted position as long as the force on the preloaded spring does not exceed its preloaded threshold, and which allows the tilting of the receiving nacelle when the preloaded threshold is exceeded. When the torque applied to the balance arm exceeds the preloaded threshold of the at least one preloaded spring, the spring is provided to temporarily allow a free orientation of the receiving nacelle, while forcing a return to the non-tilted position, so that the locking system does not remain at a stop once the kingpin has been locked by its cowling part in the receiving nacelle. Thus, the balance arm is detachable to allow the receiving nacelle to be temporarily separated from the horizontal plane thereof to ensure a perfect locking thereof with a slightly off-center cowling part.

According to an additional exemplary implementation, the lifting device is a screw jack, a pneumatic jack, a hydraulic jack or an electric jack. Indeed, these lifting devices are preferred because they are very resistant to vertical forces.

According to an exemplary implementation, the rigid linking structure comprises longitudinal rigid arms connected to each other by crossbars, which gives it a significant ruggedness.

According to another exemplary implementation, the locking system comprises:

a vertical upright integral with the receiving nacelle and extending it downwards;

a balance arm pivotally connected to the vertical upright by an assembly pin and connected to the lifting system in a vertically slidable manner with respect to said lifting system;

and wherein the mechanical stops are located on the balance arm, and the longitudinal forwards and backwards tilting movement of the receiving nacelle is limited by the contact of the vertical upright against said mechanical stops; and wherein, the elastic return device is connected to the balance arm and to the vertical upright.

According to an additional exemplary implementation, the assembly pin is located in the median zone of the balance arm, a first end of the balance arm is connected to the lifting system, and the second end of the balance arm is connected to the elastic return device by a pivot pin.

According to an exemplary implementation, the elastic return device is mounted on the vertical upright by a hinge.

According to another exemplary implementation, the elastic return device comprises two recesses each enclosing a preloaded spring, a first end of each recess being pivotally mounted on a rod that passes through the vertical upright, and the second end of each recess being pivotally mounted on the pivot pin that passes through the second end of the balance arm.

According to an additional exemplary implementation, the vertical upright terminates at the lower part by two parallel flanges between which the balance arm is received, and in that the assembly pin is a rod that passes through the balance arm and said two flanges.

According to an exemplary implementation, the lifting system has two vertical slideways in which a transverse rod integral with the balance arm slides, the transverse rod being retained in each slideway at its ends by transverse stops. According to this example, the length of the vertical slideways can limit the amplitude of vertical travel of the balance arm.

According to another exemplary implementation, the railway unit comprises a shock detection device provided to detect if the support structure carrying a semi-trailer has undergone a shock likely to damage the kingpin. Said device provides additional safety to the locking system, particularly in the case where it is desirable to know if said system has undergone significant shocks.

According to an additional exemplary implementation, the rigid linking structure is connected to the support structure by a hinge, and the shock detection device comprises at least one shear pin provided in said hinge and which breaks when the rigid linking structure undergoes longitudinal force that exceeds a given threshold, said breakage of the shear pin allowing an abnormal longitudinal movement of the rigid linking structure. The breaking threshold of the shear pins thus makes it possible to select for which shock threshold it is desirable for the shock detection device to be actuated.

According to another exemplary implementation, the support structure is equipped with a bypass pipe connected to a general pneumatic pipe that supplies and controls the brakes of the support structure, and the shock detection device further comprises a cutting tool which, in the event of abnormal longitudinal movement of the rigid linking structure, totally or partially cuts the said bypass pipe.

According to one embodiment, the lifting system comprises an actuator controlled to move and position the nacelle at a height compatible with the height of the semi-trailer. Thus, it is possible to obtain a multitude of positions and to adapt to the different heights of semi-trailers.

Functioning without energy, the shock detection device is therefore satisfactory from the safety point of view. Thanks to the cutting of a portion of the bypass pipe and to the resulting leak of fluid, users are advantageously alerted to the fact that the kingpin has suffered a significant shock, so that it can be inspected to determine whether the semi-trailer is usable in its current condition.

Thus, particularly in the preferred case where the alert to the users concerning the shock is produced by locking the brakes of the support structure, the shock detection device is reversible and enables the unlocking of the brakes. Once actuated by a significant shock, the shock detection device does not prevent the functioning of the kingpin locking system of the semi-trailer on the support structure, or the unloading of the concerned semi-trailer off of the support structure.

The design comprising the immobilization system and the support structure therefore has undeniable advantages.

Advantageously, the support structure is a railway unit.

According to another application, the support structure is a load bed of a road vehicle.

According to another application, the support structure is a load bed of an aircraft.

According to yet another application, the support structure is a load bed of a ship.

Advantageously, according to one embodiment, the support structure is separable from the transport vehicle thereof by a handling system. The support structure can therefore be removably mounted on a transport vehicle. Alternatively, the transport structure can be integrated with the transport vehicle or can constitute said transport vehicle.

BRIEF DESCRIPTION OF THE DRAWINGS

Other features and advantages of the described embodiments will become clearer in reading the description that follows, made in reference to the attached figures, given by way of non-limiting examples, wherein.

DETAILED DESCRIPTION

Figure 1:
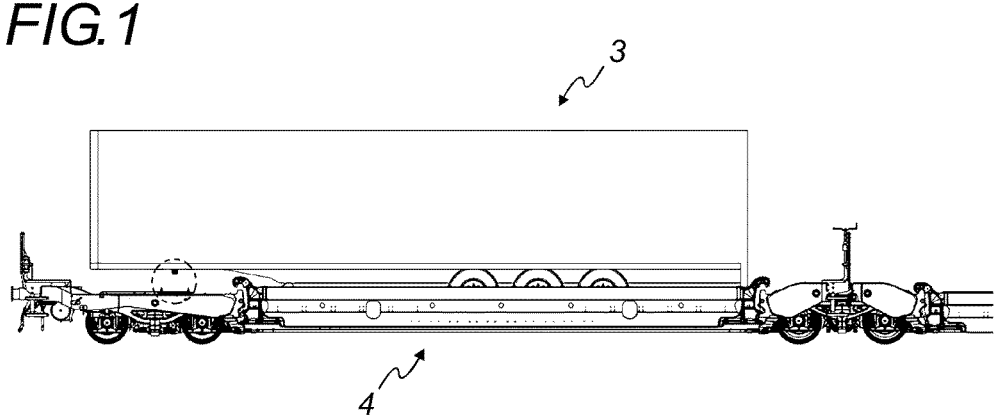
FIG. 1 is a profile view of a semi-trailer mounted on a railway unit equipped with a locking system in which the nacelle is in the low position.

The structurally and functionally identical elements shown in several different figures are assigned the same numerical or alphanumerical reference.

In this text, longitudinal direction is understood as the direction of movement of a support structure, which corresponds to the principal axis of said support structure, and transverse direction is understood as a horizontal direction perpendicular to the longitudinal direction.

In the following, for reasons of simplification of the presentation of the described embodiments, reference will be made more particularly to a support structure constituting a railway unit or a subassembly thereof, but the contemplated embodiments are in no way limited to such application.

Since a railway unit is intended to be able to travel in either direction, strictly speaking it does not include a front part and a rear part. Nevertheless, to refer to a direction along the longitudinal axis of the railway unit, reference will be made to the side located towards the near end of the railway unit (the left side in the figures) and to the side located towards the center of the railway unit (the right side in the figures), because the locking system is located at one of the ends of a railway unit.

The locking system (1) of the kingpin (2) of a semi-trailer (3) on a railway unit (4) developed by the applicant comprises a receiving nacelle (5) mounted vertically movable on a support structure (4) or railway unit (4) and provided to receive a cowling part (6) mounted by a central opening on the kingpin (2) of a semi-trailer (3). The vertical movement of the receiving nacelle (5) is ensured by a lifting system (7) comprising a lifting device (8) of the receiving nacelle (5).

Figure 2:
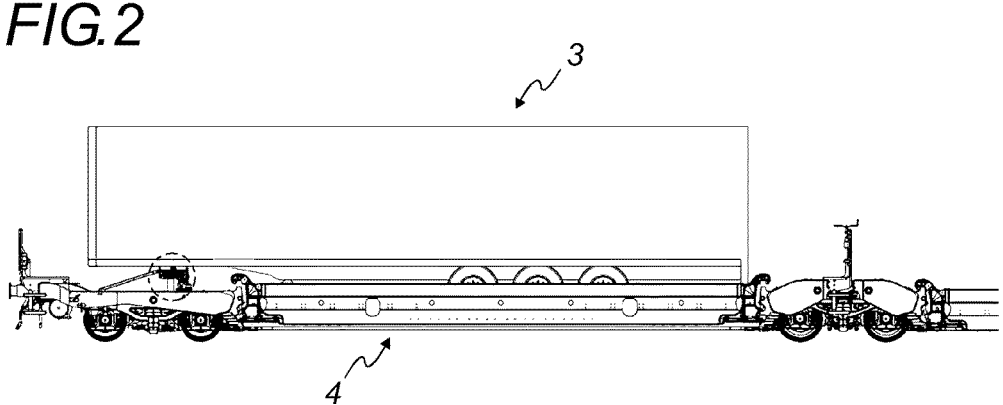
FIG. 2 is a view equivalent to FIG. 1, but in which the nacelle is in the upper position of engagement with the kingpin of the semi-trailer.
Figure 3:
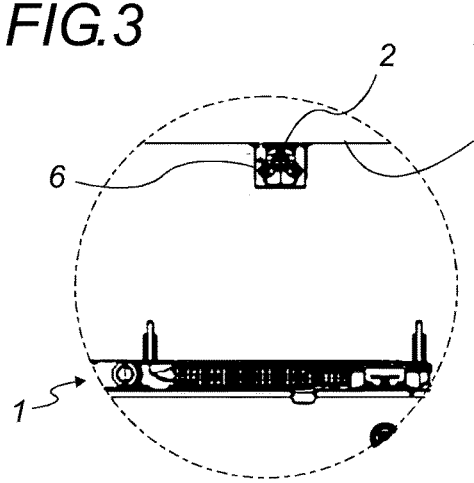
FIG. 3 is a view in detail of the encircled part in FIG. 1.
Figure 4:
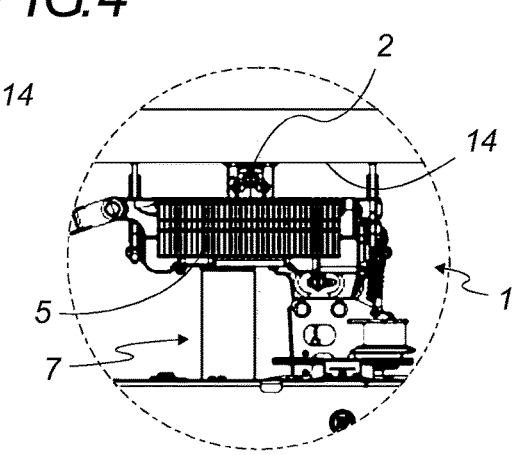
FIG. 4 is a view in detail of the encircled part in FIG. 2.

The railway unit (4) is preferably an intermodal rail-highway wagon for semi-trailers (3) (see FIGS. 1 and 2).

The lifting system (7) of the nacelle represented by way of example in the figures comprises a jack screw (9), composed of a lifting screw (10) slidably mounted in a sleeve (11), and disposed vertically beneath the receiving nacelle (5). Instead of a jack screw (9), said lifting system (7) can also comprise a pneumatic, hydraulic or electric jack, or any other means adapted for the vertical displacement of the receiving nacelle (5) while withstanding the vertical forces during the locking of the kingpin (2) of a semi-trailer (3) on a railway unit (4) and during transport of said semi-trailer (3) by said railway unit (4).

When a semi-trailer (3) is placed on the railway unit (4), the kingpin (2) thereof, equipped with a cowling part (6), is positioned above the receiving nacelle (5). The receiving nacelle (5) is then moved upwards by the lifting system (7) to receive the cowling part (6) with which the kingpin (2) is equipped. Said cowling part (6) is then centered, immobilized laterally and longitudinally, and locked vertically by the receiving nacelle (5).

For example, the receiving nacelle (5) represented in the figures comprises two rows of tilting elements (12), each weighted and of a shape designed to ensure gravity return to lock the cowling part (6). During transport of a semi-trailer (3) on a railway unit (4) equipped with a locking system (1) of the kingpin (2), the semi-trailer (3) rests on the tilting elements (12) of the receiving nacelle (5) and on the cowling part (6), which itself is supported on said tilting elements (12).

During unloading of a semi-trailer (3) thus transported on a railway unit (4), the cowling part (6) is disengaged from the receiving nacelle (5). The receiving nacelle (5) is then lowered down again by the lifting system (7) and the cowling part (6) can be withdrawn after being unlocked from the kingpin (2). A tractor vehicle can then come pick up the semi-trailer (3) by engaging the kingpin (2) thereof with a fifth wheel provided for that purpose, then by towing the semi-trailer (3) by the kingpin (2) thereof.

According to another embodiment, during unloading of a semi-trailer (3) thus transported on a railway unit (4), the kingpin (2) is disengaged from the cowling part (6) either by a movement to raise the semi-trailer (3) or by lowering the receiving nacelle (5). A tractor vehicle can then come pick up the semi-trailer (3) by engaging the kingpin (2) thereof with a fifth wheel provided for that purpose, then by towing the semi-trailer (3) by the kingpin (2) thereof. The cowling part (6) can be withdrawn from the receiving nacelle (5).

In its lower part, the receiving nacelle (5) is connected to the lifting system (7) by an articulation (13), for example a ball and socket (13'), which ensures that the receiving nacelle (5) is held vertically while allowing the free orientation thereof. Indeed, when the receiving nacelle (5) is moved upwards to press against the pivot plate (14) of a semi-trailer (3) to engage the cowling part (6) mounted on the kingpin (2) of the semi-trailer (3), it may occur that said pivot plate (14) is not parallel to the railway unit (4).

The articulation mounting (13) of the receiving nacelle (5) therefore allows the receiving nacelle (5) to press parallel against the pivot plate, substantially horizontal, irrespective of the orientation of said pivot plate.

The articulation (13) is preferably provided substantially in the middle of the bottom face of the receiving nacelle (5).

The lifting system (7) is pivotally mounted on the railway unit (4) at a pivot pin (15) that is transverse with respect to the longitudinal axis of the railway unit (4). This pivotal mounting of the lifting system (7) allows it to avoid longitudinal shock in the event of buffering shock, the longitudinal force then being converted to a pivoting movement of the lifting system (7) around the pivot pin (15) thereof.

When a semi-trailer (3) rests on the tilting elements (12) of the receiving nacelle (5) and on the cowling part (6), the vertical load of the semi-trailer (3) is absorbed by the receiving nacelle (5) and retransmitted to the railway unit (4) through the lifting system (7). The lifting system (7) is therefore not subjected to the vertical forces, which correspond to the vertical load of the semi-trailer (3).

Figure 5:
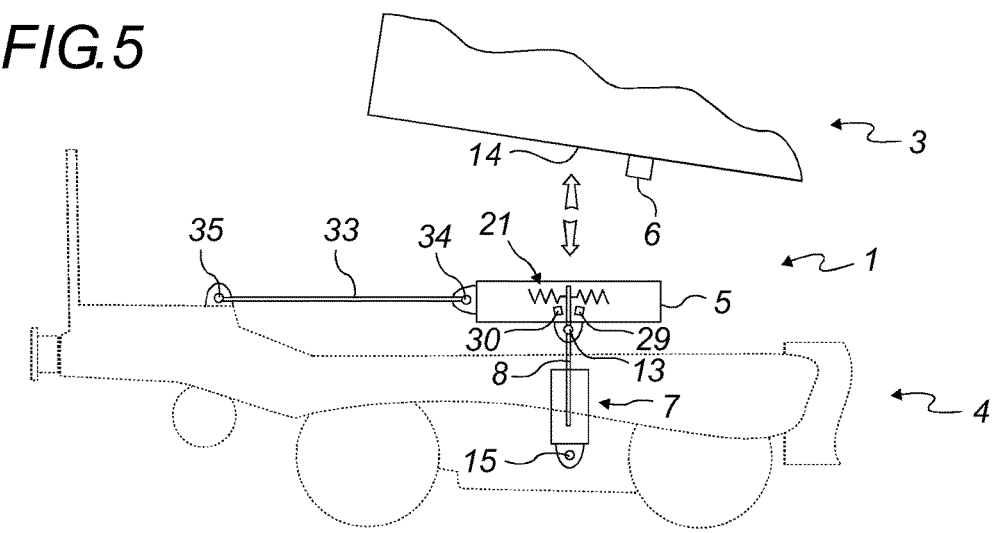
FIGS. 5 to 7 are simplified schematic figures illustrating an embodiment and an example of kinematic functioning thereof.
Figure 6:
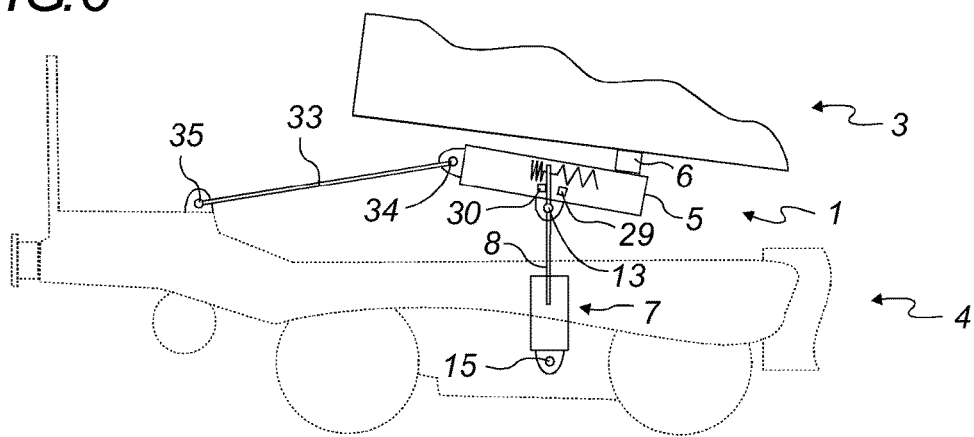
Figure 7:
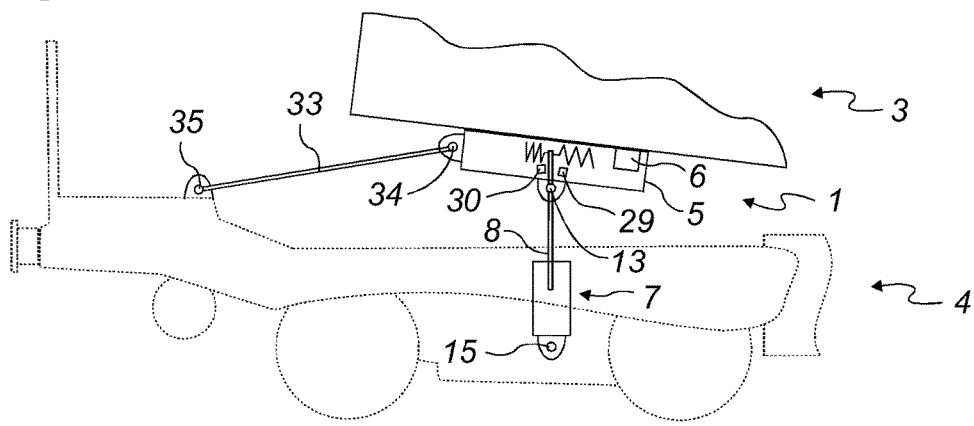
Figure 8:
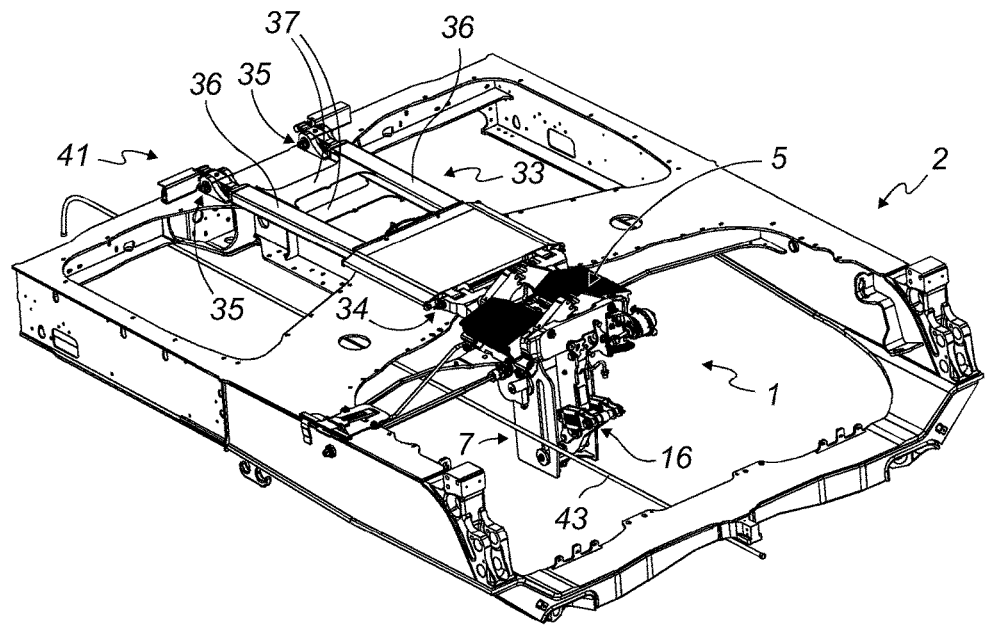
FIG. 8 is a top perspective view of a part of a railway unit comprising a locking system in which the nacelle is in the low position.
Figure 9:
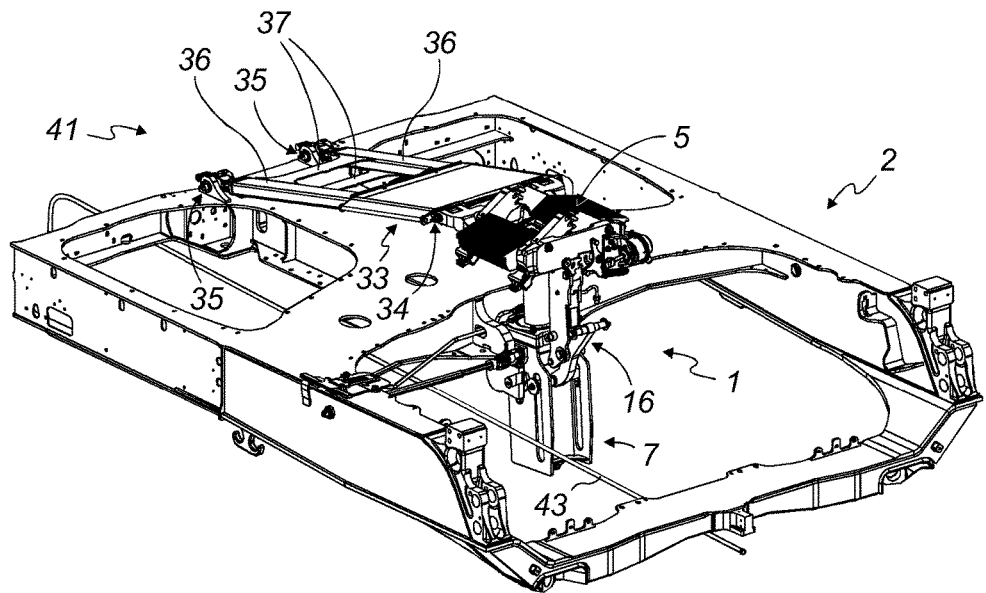
FIG. 9 is a view equivalent to FIG. 8, but in which the nacelle is in the high position.
Figure 10:
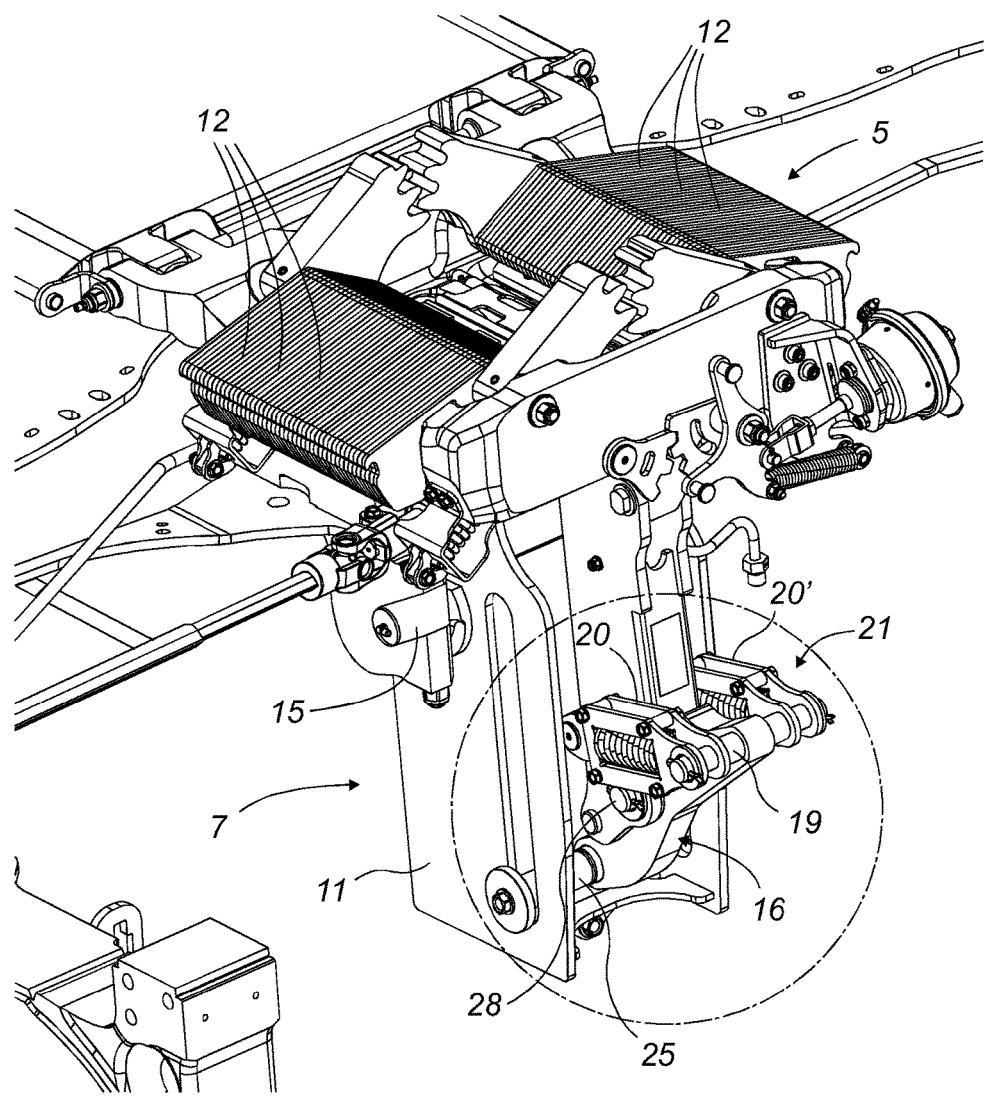
FIG. 10 is a detailed top view in perspective of the receiving nacelle and of the device provided for the vertical movement thereof, wherein a cowling part is received in the receiving nacelle.
Figure 11:
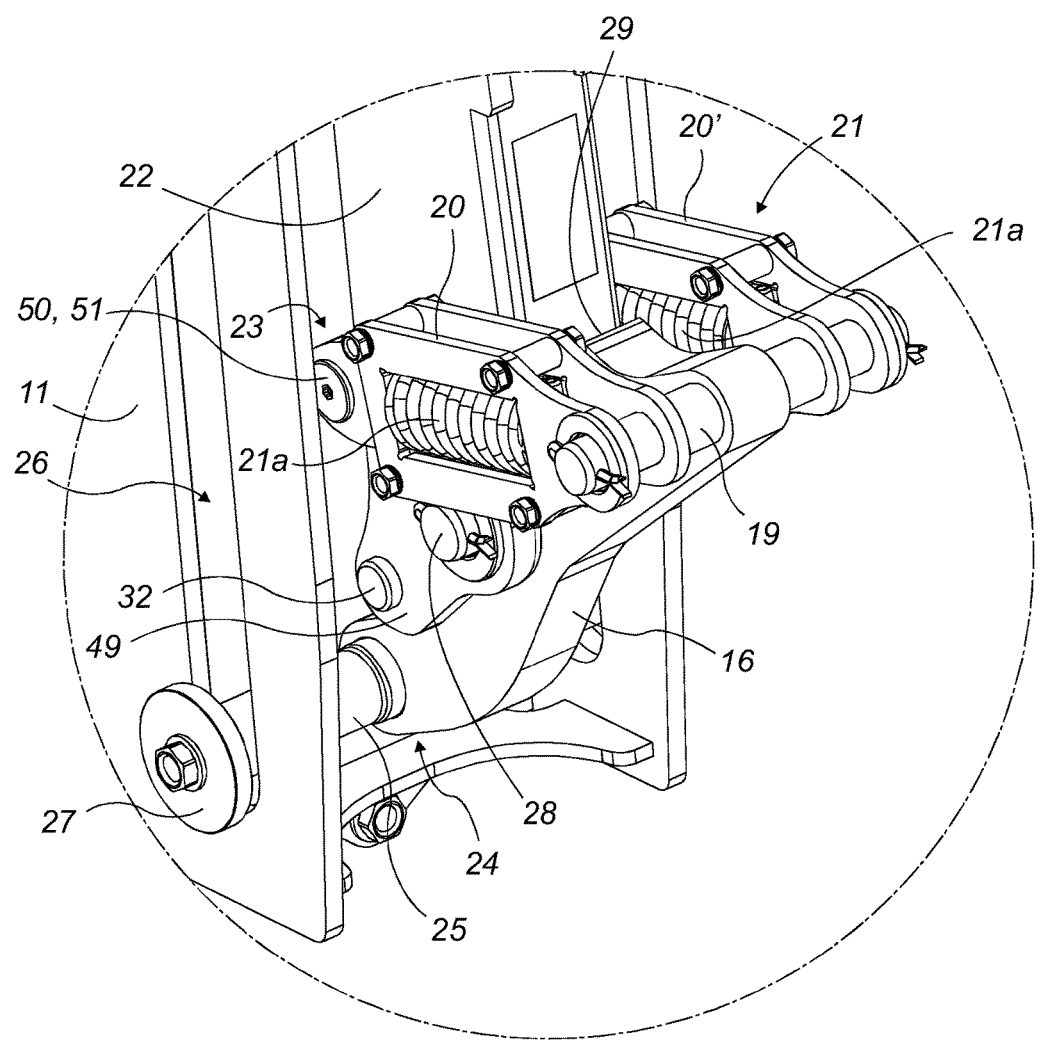
FIG. 11 is a view in detail of the encircled part in FIG. 10.
Figure 12:
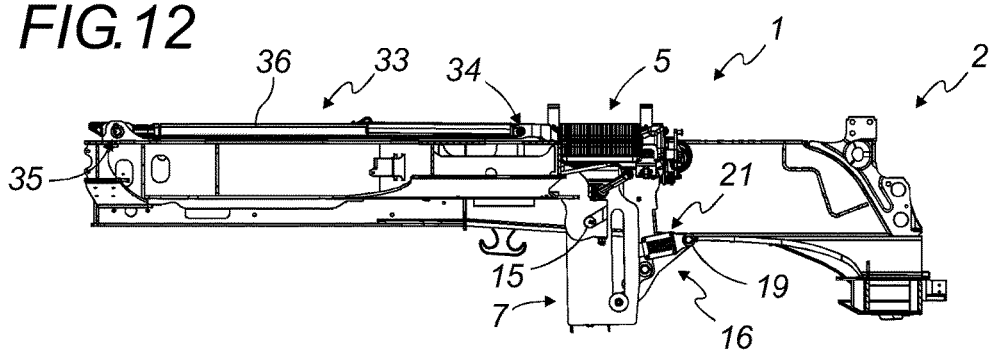
FIG. 12 is a profile view of a part of a railway unit comprising a locking system in which the nacelle is in the low position.
Figure 13:
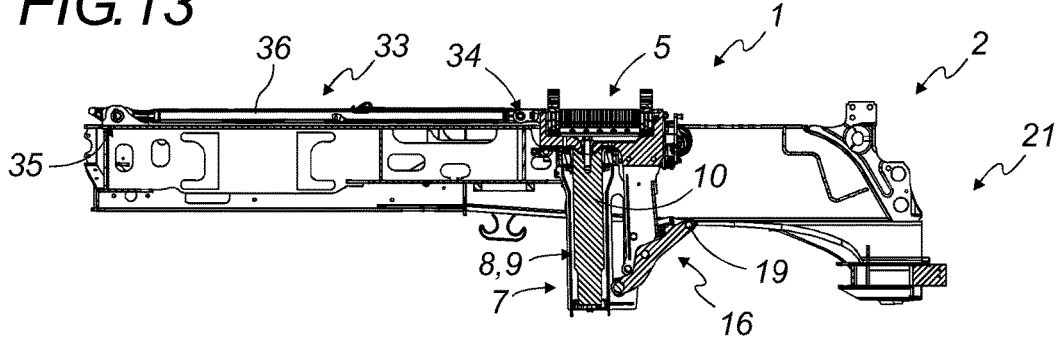
FIG. 13 is a vertical cross-sectional view corresponding to FIG. 12.
Figure 14:
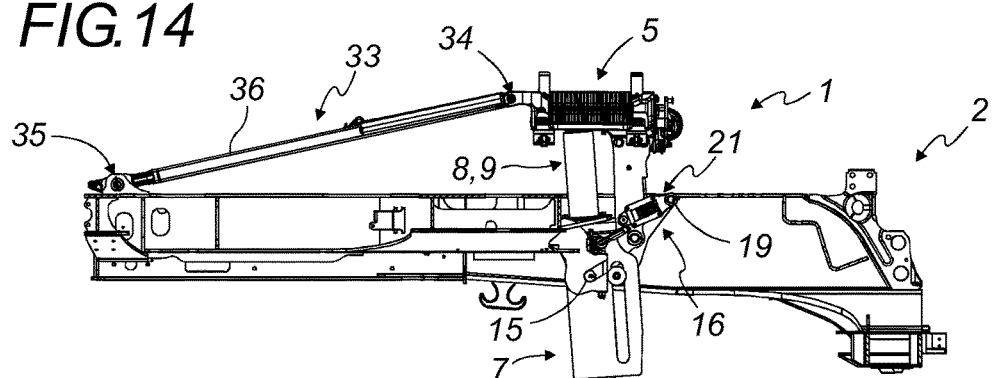
FIG. 14 is a profile view of a part of a railway unit comprising a locking system in which the nacelle is in the high position.
Figure 15:
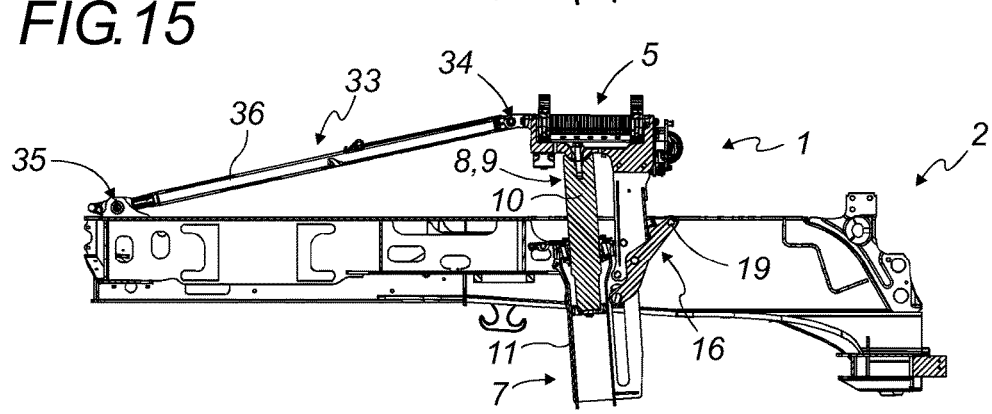
FIG. 15 is a vertical cross-sectional view corresponding to FIG. 14.

The essential means of the locking system (1) are represented schematically and simplified in FIGS. 5, 6 and 7. These figures illustrate the steps of immobilization reception of a sloping semi-trailer (3) by the locking system (1) equipping a railway unit (4). The kingpin (2) of the semi-trailer (3) is housed in a cowling part (6) in order to be received in the receiving nacelle (5).

In these figures, the lifting system (7) also fulfills the function of balancing for the receiving nacelle (5).

The mechanical stops (29, 30) that limit the longitudinal tipping movement of the receiving nacelle (5) forwards and backwards are also represented, just as the elastic return device (21) which returns the receiving nacelle (5) to the non-tilted position.

Also represented in these figures is a substantially horizontal rigid linking structure (33) extending longitudinally and absorbing the longitudinal forces on the receiving nacelle (5), said rigid linking structure (33) being hingedly connected to the receiving nacelle (5) by the first end thereof and hingedly connected to the railway unit (4) by the second end thereof.

In FIG. 5, the receiving nacelle (5) is in the process of vertically rising towards the semi-trailer (3). It is held in a horizontal plane by the elastic return device (21).

In FIG. 6, the receiving nacelle (5) comes into contact with the cowling part (6) and the elastic return device (21) is pulled so as to allow the tilting of the receiving nacelle (5), said tilting being limited by the stops (29, 30).

In FIG. 7, the cowling part (6) is received in the receiving nacelle (5), which is partially returned to the horizontal position by the elastic return device (21), so that the locking system (1) is no longer against a stop.

In the following description, we will be concerned with a preferred embodiment.

The locking system (1) also comprises a balance arm (16) provided to guide the vertical movement of the receiving nacelle (5), maintain it in position above the lifting system (7) in a horizontal plane and absorb the forces to which it is subjected.

Said balance arm (16) maintains the receiving nacelle (5) in a horizontal plane during the vertical movements thereof, as long as it is not in contact with a cowling part (6).

However, when the receiving nacelle (5) is in contact with a cowling part (6), the balance arm (16) is intended to allow a free orientation of the receiving nacelle (5), or at least a longitudinal tilting thereof, so that it can be properly pressed against the pivot plate (14) or the deck of the semi-trailer (3), which are likely not to be perfectly horizontal. Nevertheless, for functional and safety reasons, the free orientation of the receiving nacelle (5) is limited in amplitude by mechanical stops (29, 30).

The balance arm (16) thus allows a certain mobility of the receiving nacelle (5) during reception of a cowling part (6).

The locking system (1) also comprises a rigid linking structure (33).

The balance arm (16) and the rigid linking structure (33) are in particular intended to guide the vertical movement of the receiving nacelle (5).

The balance arm (16) comprises an elastic return device (21) hingedly mounted on the balance arm (16) at an articulation pin (19).

In general, the balance arm (16) is extended longitudinally and off-center with respect to the nacelle, with the articulation pin (19) thereof directed to the side oriented towards the center of the railway unit (4).

The elastic return device (21) is also hingedly connected to the receiving nacelle (5) by an articulation (50), preferably at a vertical upright (22) extending downwards from the receiving nacelle (5).

The elastic return device (21) is preferably in the form of a fork with two recesses (20, 20') each having a preloaded spring (21a). Said two recesses (20, 20') are provided on either side of the vertical upright (22), with the free end (23) of each recess (20, 20') being hingedly mounted on said vertical upright (22) by an articulation (50), for example by means of a rod (51) that passes through said vertical upright (22).

The balance arm (16) is preferably in the form of a rigid S-shaped part. The free end (24) thereof is slidably mounted on the lifting system (7), for example on the sleeve (11) of the jack screw (9). Said free end (24) of the balance arm (16) comprises for example a transverse rod (25) that slides vertically, guided in two vertical slideways (26) provided on the lifting system (7), the transverse rod (25) being held in each slideway (26) at the ends thereof by transverse stops (27).

The balance arm (16) is also hingedly mounted at substantially the median part thereof on the vertical upright (22) of the receiving nacelle (5), by an assembly pin (28). For this assembly, the lower part of the vertical upright (22) is for example in the form of two parallel flanges (49, 49') between which the balance arm (16) is pivotally received, the assembly pin (28) then being for example in the form of a rod which passes through the balance arm (16) and said two flanges (49, 49').

When the lifting system (7) moves the receiving nacelle (5) vertically, the balance arm (16) secured thereto is also moved vertically, with the transverse rod (25) which slides in each slideway (26), which enables the receiving nacelle (5) to be guided during its movement so that it remains in a horizontal plane.

The length of the vertical slideways (26) makes it possible to limit the vertical travel of the balance arm (16).

In a normal situation, the balance arm (16) and particularly the elastic return device (21) are intended to maintain the receiving nacelle (5) in a horizontal plane (see FIGS. 12 to 16).

Although the balance arm (16) is secured to the receiving nacelle (5), the latter remains disengageable due to the preloaded springs (21a), so as to allow the free orientation of the receiving nacelle (5) when it is in the upper position of receiving a cowling part (6), particularly in a case where the receiving nacelle (5) and the pivot plate (14) are not parallel.

Figure 17:
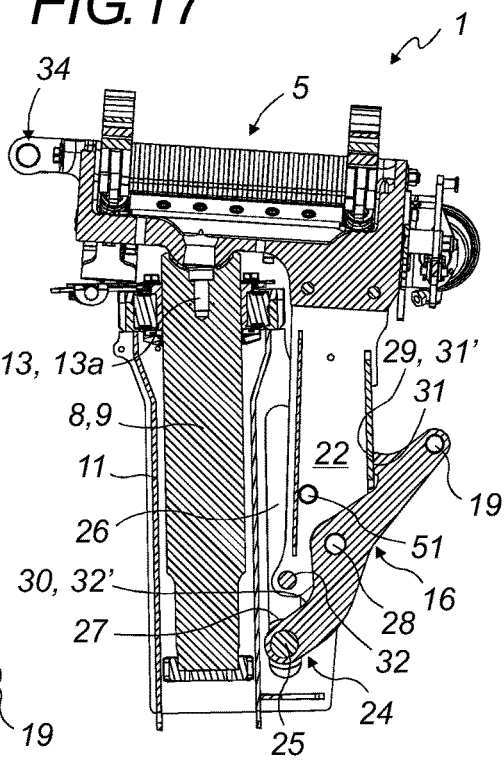
FIG. 17 is a view equivalent to the one in FIG. 16, but in which the nacelle is tilted towards the right with the balance arm at the upper stop.
Figure 18:
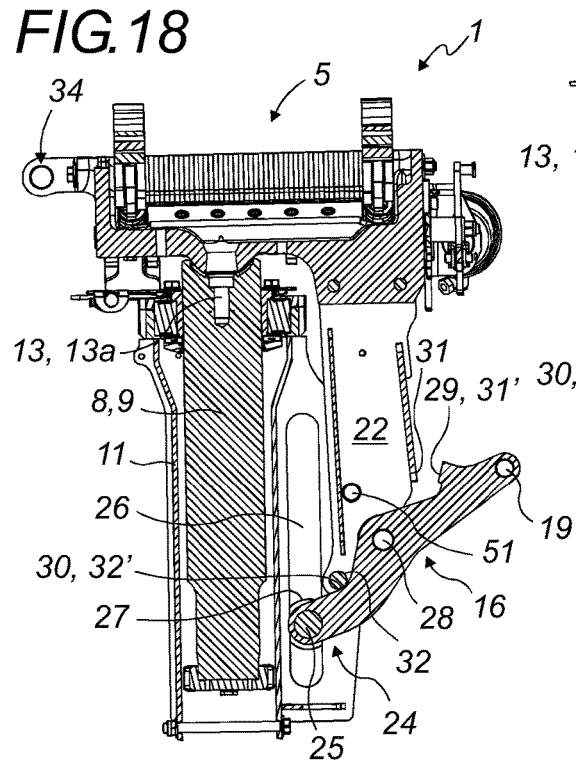
FIG. 18 is a view equivalent to the one in FIG. 16, but in which the nacelle is tilted towards the left with the balance arm at the lower stop.

Indeed, when the force on each preloaded spring (21a) exceeds its preloaded threshold, the spring is under compression and the balance arm (16) can pivot around the middle assembly pin (28) and thus allow free orientation of the receiving nacelle (5) outside a horizontal plane (see FIGS. 17 and 18). Nevertheless, for reasons of safety, this pivoting is limited in amplitude in both end positions of disengagement by means of a first stop (29) in one direction of pivoting, and a second stop (30) in the other direction of pivoting.

The first stop (29) is preferably in the form of a stop surface (31') provided on an upper part of the balance arm (16), above the middle assembly pin (28) and on the side of the balance arm (16) which is oriented towards the lifting system (7) (i.e. the left side in the figures). In the first disengagement end position of the balance arm (16), corresponding to a receiving nacelle (5) tilted on the side towards the center of the railway unit (4) (i.e. the right side of FIG. 17), the stop surface (31') comes into contact with the stop surface (31) facing it and provided for that purpose on the vertical upright (22) which extends the receiving nacelle (5) downwards.

The second stop (30) is preferably in the form of a stop surface (32') intended to come to a stop against a stop rod (32) provided transversely at the lower part of the vertical upright (22) which extends the nacelle downwards, for example at the free end of the two flanges (49, 49') mentioned previously. In the second disengagement end position of the balance arm (16), corresponding to a receiving nacelle (5) tilted to the side located towards the near end of the railway unit (4) (i.e. left side of FIG. 18), the stop surface (32') of the balance arm (16) situated at the end of the railway unit (4) comes into contact with said stop rod (32).

Said stops (29, 30) could also be provided by the preloaded springs (21a) themselves.

The upper part of the receiving nacelle (5) is connected to the railway unit by a rigid linking structure (33) that meets railway standards for sturdiness and which extends longitudinally in the direction in which the railway unit (4) moves so as to receive and withstand the longitudinal shocks to which the receiving nacelle (5) is subjected.

Disposed longitudinally with respect to the railway unit (4), the rigid linking structure (33) absorbs the horizontal forces exerted on the receiving structure (5) by the kingpin (2) of the semi-trailer (3) carried by the railway unit (4) when the kingpin (2) is received in the receiving nacelle (5).

At a first end, the rigid linking structure (33) is hingedly connected to the upper part of the receiving nacelle (5) by a first articulation (34), while it is hingedly connected to the railway unit (4) at the second end thereof by a second articulation (35).

The rigid linking structure (33) can comprise rigid arms (36), preferably longitudinal, connected by cross members (37). Said rigid arms (36) are preferably two in number, but there can be a higher number thereof.

According to one embodiment represented in the drawings, at its second articulation (35) the rigid linking structure (33) can for example be hingedly connected to the railway unit (4) by means of a link pin (38). Said link pin (38) is for example mounted on the railway unit (4), received pivotally in an oblong (39) made in the rigid linking structure (33) and capable of moving in said oblong (39). A pin (40) prevents for example the movement of the link pin (38) in the oblong (39), but not the pivoting of the rigid linking structure (33) with respect to the railway unit (4).

In the case in which the rigid linking structure (33) comprises longitudinal rigid arms (36), each of said rigid arms (36) can then be hingedly connected to the railway unit (4) by means of a common link pin (38) or by a different link pin (38).

According to one variant, the rigid linking structure (33) can be hingedly connected to the railway unit (4) by means of a pivotally mounted pin (38).

According to one variant, the rigid linking structure (33) can also comprise a shock absorber device (not shown) provided to absorb the longitudinal shocks received thereby. Such a shock absorber device can for example comprise an elastic element that absorbs shock by reversible deformation, as well as an energy dissipating element, such as a shock absorbing structure by irreversible deformation, by friction or by breaking. The shock absorbing device can for example comprise a hydraulic cylinder.

According to another variant, the locking system (1) can comprise a shock detection device (41) making it possible to detect if the railway unit (4) carrying a semi-trailer (3) has suffered a shock likely to damage the kingpin (2).

This shock detection can for example be achieved by an abnormal movement of the rigid linking structure (33) which then causes modifications of the locking system (1) that can be easily detected.

According to an advantageous embodiment of this variant, the shock detection is achieved for example by the total or partial cutting of a bypass pipe (42) connected to the general pneumatic pipe (43) which in particular feeds and controls the brakes of the railway unit (4). Indeed, such a general pipe (43) normally equips all railway wagons.

This cutting of a bypass pipe (42) then causes a leak in the general pipe (43), which causes the activation of the brakes of the railway unit (4). Indeed, these brakes are usually fail-safe, and any drop in pressure in the general pipe (43) causes the activation of braking, the intensity of which is proportional to the value of the drop in pressure in the general pipe (43).

Such activation of the brakes of the railway unit (4) then immediately alerts the users, while preventing the travel of the railway unit (4) transporting a semi-trailer (3) the kingpin (2) of which is potentially damaged.

The part (44) of the bypass pipe (42) that is intended to be cut is easily visible from the exterior, which enables users to easily identify the railway unit (4) for which the bypass pipe (42) has been cut. In order to stop the leak at the general pipe (43), the shock detection device (41) includes an isolation valve (45) allowing the bypass pipe(s) (42) to be isolated that have been cut.

According to this embodiment, the pin (40) which prevents the movement of each link pin (38) in the oblong (36) associated therewith is preferably in the form of a shear pin (40). In the event of longitudinal shock exceeding a certain threshold, the shock produces a force between the rigid linking structure (33) and the railway unit (4) and is received by the pins (40), each shear pin (40) being intended to be broken and thus allow movement of each link pin (35) in the oblong (36) associated therewith.

The shock detection device (41) then also comprises a bypass pipe (42) mounted to bypass the general pipe (43), normally pneumatic, which in particular supplies and controls the brakes of the railway unit (4).

According to this embodiment, the shock detection device (41) also comprises a cutting tool (46) which cuts the bypass pipe (42) when the shear pin (40) is broken and a link pin (35) is moved in the oblong. Thus, when the rigid linking structure (33) is moved after breaking at least one shear pin (40), the cutting tool (46) cuts the bypass pipe (42).

Figure 19:
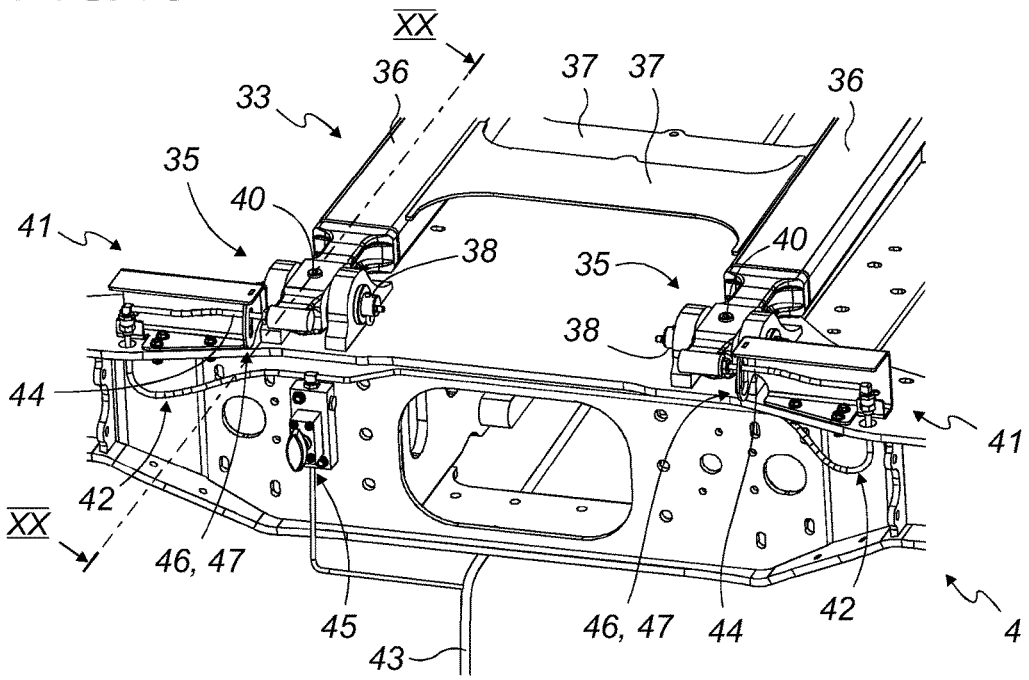
FIG. 19 is a view in perspective of part of a railway unit comprising a kingpin locking system as well as a shock detection device.
Figure 20:
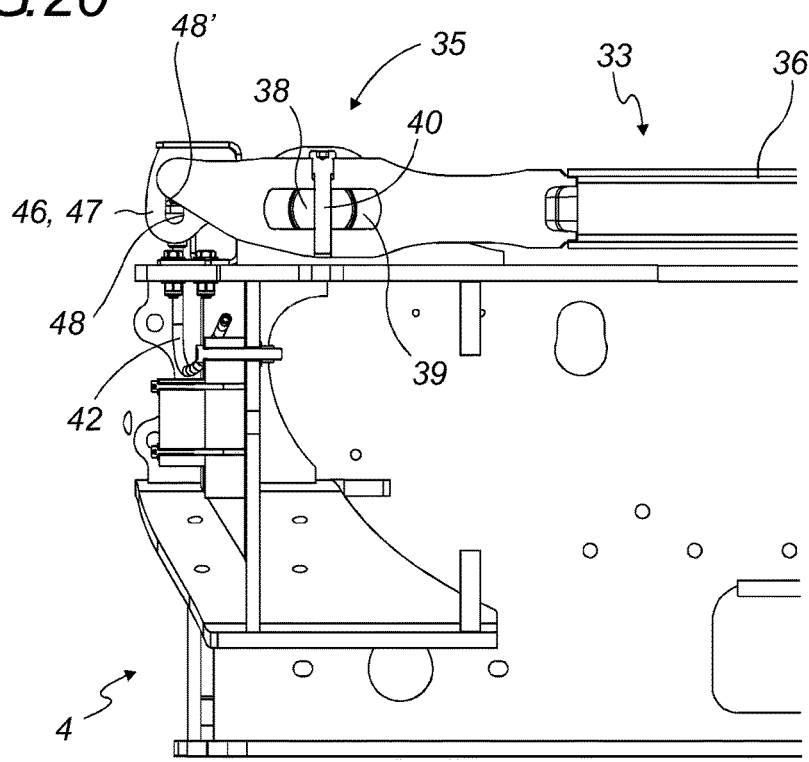
FIG. 20 is a view in vertical cross-section along the X-X axis represented in FIG. 19.

According to an embodiment represented in FIGS. 19 and 20, the cutting tool (46) is secured to the railway unit (4), while the bypass pipe (42) is secured to the rigid linking structure (33). Of course, it is possible to provide a reverse configuration.

The cutting tool (46) is preferably in the form of a guillotine (47) comprising two blades (48, 48') each provided at the front and rear of the portion (44) of the bypass pipe (42) to be cut, in order to cut it off when the cutting tool (46), attached to the rigid linking structure (33), is moved longitudinally.

According to the preferred embodiment wherein the rigid linking structure (33) is in the form of two rigid arms (36), a shear pin (40) is provided at the end of each rigid arm (29), and a bypass pipe (42) and an associated cutting tool (46) are provided at each of said rigid arm ends (29).

In the event of buffering shock of the railway unit (4) equipped with the shock detection device (41), the rigid linking structure (33) undergoes a longitudinal force that is transmitted both to the kingpin (2) as well as to the shear pin (40). If the violence of the shock is likely to damage the kingpin (2), the shear pin (40) is broken.

In the event the shock detection device (41) comprises a plurality of shear pins (40), bypass pipes (42) and cutting tools (46), at least one of the shear pins (40) is then broken and the cutting tool (46) thus moved then cuts the concerned bypass pipe (42).

When the railway unit (4) for which the bypass pipe (42) has been cut has been identified, the users are then informed that the kingpin (2) of the semi-trailer (3) carried by said railway unit (4) is potentially damaged. The integrity of the kingpin can then be examined, for example on site by taking the kingpin (2) out of the receiving nacelle (5), or elsewhere, by moving the semi-trailer (3) and/or the railway unit (4) in order to be able to examine the kingpin (2) later, without delaying the transport of other railway units coupled to the concerned railway unit (4).

When the shear pin (40) has been broken, the locking system (1) of the kingpin (2) of a semi-trailer (3) on a railway unit (4) remains fully functional. Each link pin (35) of the rigid linking structure (33) is always maintained in an oblong (36), with a slight longitudinal clearance corresponding to the limited travel intended for each side in each oblong (36), which does not hinder its operation. The longitudinal movement of each link pin (35) in the oblong (36) associated therewith, in the event of breaking of the shear pin (40), remains limited by this limited travel.

The limited travel is provided in the front and rear of each link pin (35) so that the shock detection device (41) functions the same way for a front or rear shock. This is also why the cutting tool (46) has two blades (48, 48') provided at the front and rear of the portion (44) of the bypass pipe (42) intended to be cut in the event of significant shock.

In order to be able to reuse the shock detection device (41), it is sufficient to replace the shear pin or pins (40) that have been broken, as well as the portion (44) of the bypass pipe or pipes (42) that have been cut.

The operation of the locking system (1), and particularly of the balance arm (16) and the rigid linking structure (33), will now be described for the different phases of movement of the receiving nacelle (5), when the cowling part (6) is offset in either direction with respect to the center of the receiving nacelle (5) where ideally it is intended to be received.

Raising Phase of the Receiving Nacelle

During the raising phase of the receiving nacelle (5), the lifting system (7) is actuated so as to push the receiving nacelle (5) upwards. The latter is raised on the lifting system (7) by means of an articulation (13), for example a ball joint (13'), but is maintained in a horizontal plane and the rotation thereof is prevented, both by the rigid linking structure (33) as well as by the balance arm (16), the preloaded springs of which contribute a certain stiffness to holding it.

During this phase, the lifting screw (10) slides upward with respect to the sleeve (11) thereof, which remains fixed, the receiving nacelle (5) is moved upwards, and the balance arm (16) also rises, guided by the vertical slide of the transverse rod (25) thereof in the slideways (26).

When the receiving nacelle (5) comes in contact with the cowling part (6) mounted on the kingpin (2) of the semi-trailer, said cowling part (6) is received in the receiving nacelle (5).

Depending on whether the kingpin (2) is properly centered with respect to the axis of the articulation (13) on which the receiving nacelle (5) is mounted, the locking system (1) reacts differently.

Kingpin Centered with Respect to the Receiving Nacelle

In this case, the receiving nacelle (5) is moved upwards while remaining in a horizontal plane, until locking of the cowling part (6) by the tilting elements (12) of the receiving nacelle (5).

Figure 16:
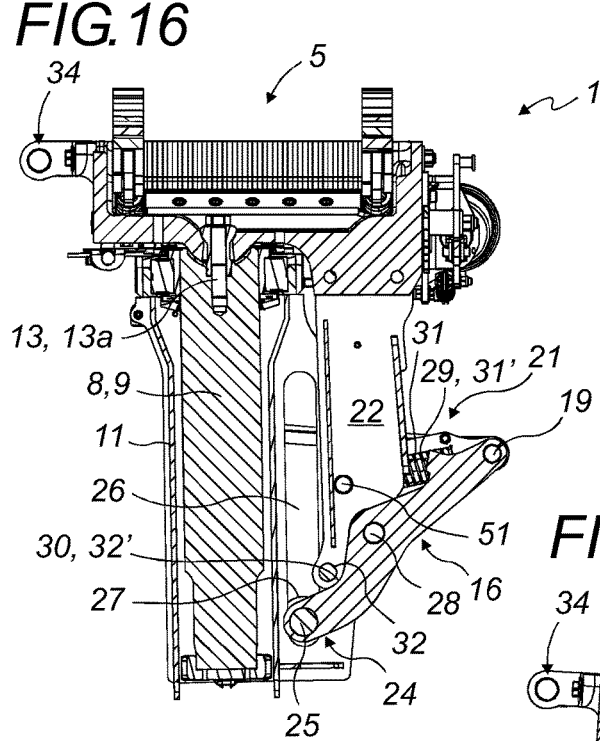
FIG. 16 is a profile view of the locking system and a balance arm, in which said arm is in the normal position.

The preloaded springs (21a) of the balance arm (16) are not pulled and the balance arm (16) remains in its normal position (see FIG. 16).

Kingpin Longitudinally off-Center with Respect to the Receiving Nacelle

In this case, when the receiving nacelle (5) is moved upwards against the kingpin (2), it tilts along a longitudinal vertical plane (see FIGS. 17 and 18). This causes a significant torque on the balance arm (16). When the torque exceeds the preloaded threshold of the preloaded springs (21a), the springs are tensioned more and the balance arm (16) pivots. The receiving nacelle (5) can then be freely oriented, within an amplitude limited by the stops (29, 30) of the balance arm (16), and pressed against the pivot plate (14) or deck of the semi-trailer (3) while the cowling part (6) is locked by the tilting elements (12).

Kingpin Laterally Off-Center with Respect to the Receiving Nacelle

In this case, when the receiving nacelle (5) is moved upwards against the kingpin (2), it tilts along a vertical plane perpendicular to the longitudinal axis of the railway unit (4).

This causes a significant torque on the balance arm (16) and on the rigid linking structure (33). This torque is absorbed on the one hand by the balance arm (16), the transverse stops (27) of which come to a stop against the slideways (26) of the sleeve (11) so as to limit the lateral pivoting of the receiving nacelle (5) which can be freely oriented, within an amplitude limited by the clearance existing between the transverse stops (27) and the sleeve (11), and come to a stop against the pivot plate (14) or the deck of the semi-trailer (3) while the cowling part (6) is locked by the tilting elements (12), and on the other hand by the torsional rigidity of the rigid structure (33).

In the event the kingpin (2) is off-center both longitudinally and laterally with respect to the receiving nacelle (5), the movements described above are combined.

Once the cowling part (6) is locked by the tilting elements (12), the receiving nacelle (5) is pressed against the pivot plate (14) or the deck of the semi-trailer (3) and the balance arm (16) returns to the normal position thereof in which neither of the stops (29, 30) is any longer in contact against the stop surface (31', 32') associated therewith. Thus, the balance arm (16) is not stressed, and said stops (29, 30) are used only during the loading phase of a semi-trailer (3) onto a railway unit (4) equipped with a locking system (1), and not during the transport phase of a semi-trailer (3).

It is evident that this description is not limited to the examples explicitly described, but that it also comprises other embodiments and/or implementations. Thus, a described technical characteristic can be replaced by an equivalent technical characteristic without going beyond the scope of the accompanying claims

The invention claimed is:

1. An immobilization system for immobilizing a semi-trailer for the transport thereof on or in a support structure, said immobilization system comprising a locking system of a kingpin of the semi-trailer on said support structure, which locking system comprises:
   a receiving nacelle mounted vertically movable on the support structure and intended to receive a cowling part mounted by a central opening on the kingpin of the semi-trailer,
   a lifting system comprising a lifting device disposed substantially vertically beneath the receiving nacelle and attached thereto in order to move the receiving nacelle vertically between a low position and at least one high position,
   wherein:
   the lifting system is mounted pivotally on the support structure at a transverse pivot pin,
   the lifting device is attached to the receiving nacelle by means of an articulation allowing at least one longitudinal tilting movement of the receiving nacelle,
   and wherein the locking system further comprises:
   mechanical stops that limit longitudinal forwards and backwards tilting movement of the receiving nacelle;
   an elastic return device that returns the receiving nacelle to a non-tilted position;
   a substantially horizontal rigid linking structure extending longitudinally and absorbing longitudinal forces on the receiving nacelle, said rigid linking structure being hingedly connected to the receiving nacelle by a first end thereof and hingedly connected to the support structure by a second end thereof.

2. The immobilization system of claim 1, wherein the articulation comprises a ball and socket joint that allows a free orientation of the receiving nacelle.

3. The immobilization system according to claim 1, wherein the elastic return device comprises at least one preloaded spring which maintains the receiving nacelle in the non-tilted position as long as a force on the preloaded spring does not exceed a preloaded threshold, and which allows the tilting of the receiving nacelle when the preloaded threshold is exceeded.

4. The immobilization system according to claim 1, wherein the lifting device is a jack screw, a pneumatic jack, a hydraulic jack or an electric jack.

5. The immobilization system according to claim 1, wherein the rigid linking structure comprises longitudinal rigid arms connected to each other by cross members.

6. The immobilization system according to claim 1, wherein:
   the locking system comprises:
   a vertical upright integral with the receiving nacelle and extending the receiving nacelle downwards;
   a balance arm pivotally connected to the vertical upright by an assembly pin and connected to the lifting system in a vertically slidable manner with respect to said lifting system; and wherein
   the mechanical stops are located on the balance arm, and the longitudinal forwards and backwards tilting movement of the receiving nacelle is limited by the contact of the vertical upright against said mechanical stops; and wherein
   the elastic return device is connected to the balance arm and to the vertical upright.

7. The immobilization device according to claim 6, wherein the assembly pin is located in a median zone of the balance arm, a first end of the balance arm is connected to the lifting system, and a second end of the balance arm is connected to the elastic return device by a pivot pin.

8. The immobilization system according to claim 6, wherein the elastic return device is mounted on the vertical upright by an articulation.

9. The immobilization system according to claim 7, wherein the elastic return device comprises two recesses each enclosing a preloaded spring, a first end of each recess being pivotally mounted on a rod that passes through the vertical upright, and a second end of each recess being pivotally mounted on the pivot pin that passes through the second end of the balance arm.

10. The immobilization system according to claim 6, wherein the vertical upright on a lower part thereof terminates in two parallel flanges between which the balance arm is pivotally received, and wherein the assembly pin is a rod which passes through the balance arm and said two flanges.

11. The immobilization system according to claim 6, wherein the lifting system has two vertical slideways in which a transverse rod integral with the balance arm slides in a guided manner, the transverse rod being retained in each slideway at the ends of the transverse rod by transverse stops.

12. The immobilization system according to claim 1, wherein the immobilization system comprises a shock detection device provided to detect if the support structure carrying the semi-trailer has suffered a shock likely to damage the kingpin.

13. The immobilization system according to claim 12, wherein the rigid linking structure is connected to the support structure by an articulation, and wherein the shock detection device comprises at least one shear pin provided in said articulation of said linking structure and which breaks when the rigid linking structure undergoes longitudinal force that exceeds a given threshold, said breakage of the shear pin allowing an abnormal longitudinal movement of the rigid linking structure.

14. The immobilization system according to claim 13, wherein the immobilization system is equipped with a bypass pipe connected to a general pneumatic pipe that supplies and controls brakes of the support structure, and wherein the shock detection device further comprises a cutting tool which, in the event of abnormal longitudinal movement of the rigid linking structure, totally or partially cuts the said bypass pipe.

15. The immobilization system according to claim 1, wherein the lifting system comprises an actuator controlled to move and position the nacelle at a height compatible with the height of the semi-trailer.

16. The immobilization system according to claim 1, wherein the support structure is a railway unit.

17. A railway unit, comprising at least one immobilization system according to claim 1.

* * * * *